United States Patent [19]

Tanaka et al.

[11] Patent Number: 4,709,871
[45] Date of Patent: Dec. 1, 1987

[54] REEL RECEIVING DEVICE

[75] Inventors: Shinsaku Tanaka, Tokyo; Kunio Kido, Wako, both of Japan

[73] Assignee: Tanashin Denki Co., Ltd., Tokyo, Japan

[21] Appl. No.: 927,184

[22] Filed: Nov. 5, 1986

[30] Foreign Application Priority Data

Feb. 13, 1986 [JP] Japan .............................. 61-19391[U]

[51] Int. Cl.$^4$ ...................... B65H 20/36; B65H 20/38
[52] U.S. Cl. .................................. 242/68.3; 242/201; 242/208
[58] Field of Search ................ 242/54 R, 55, 57, 67.4, 242/68, 68.1, 68.3, 68.5, 189, 198, 200, 201, 204, 208, 191

[56] References Cited

U.S. PATENT DOCUMENTS

| | | | |
|---|---|---|---|
| 2,882,078 | 4/1979 | MacDonald | 242/68.3 X |
| 3,240,440 | 3/1966 | Albers | 242/208 X |
| 3,659,806 | 5/1972 | Crafts | 242/201 |
| 3,888,432 | 6/1975 | Katah | 242/201 |
| 3,894,702 | 7/1975 | Okano | 242/201 |
| 4,422,589 | 12/1983 | Okada | 242/68.3 |
| 4,630,149 | 12/1986 | Ida | 242/201 X |

Primary Examiner—Donald Watkins
Attorney, Agent, or Firm—Wegner & Bretschneider

[57] ABSTRACT

A reel receiving device of a high operational reliability which can effectively prevent operation in error of a particular mechanism such as an automatic reversing mechanism or an automatic stopping mechanism which operates in response to rotation or stopping of a reel receiving body. The reel receiving body of the device has an engaging portion for engagement with a tape reel and a pair of axially opposing surfaces between which a friction coupling member is located. The friction coupling member engages with a particular mechanism for operation thereof. A friction transmission mechanism is mounted for rotation around the reel receiving body and frictionally transmits a turning force of a motor to the reel receiving body. A spring member is interposed between the friction coupling member and one of the opposing surfaces of the reel receiving body and presses the friction coupling member toward the other opposing surfaces.

3 Claims, 2 Drawing Figures

REEL RECEIVING DEVICE

BACKGROUND OF THE INVENTION

1. Field of the Invention

This invention relates to a reel receiving device including a friction coupling member which transmits a turning force of a motor to a reel receiving body by way of a frictional transmitting mechanism and operates, for example, an automatic reversing mechanism or an automatic stopping mechanism in response to rotation or stopping of the reel receiving member.

2. Description of the Prior Art

A reel receiving device in a tape recorder includes, for example, as shown in FIG. 2, a reel receiving body 3 as a main component which is mounted for rotation on a reel shaft 2 erected on a base 1 and is prevented from being pulled off the reel shaft 2 by means of a stopper (for example, an E-snap ring) 4 fitted at an end portion of the reel shaft 2.

The reel receiving body 3 includes a cylindrical member 6 having a flange 5 at a lower end thereof, a cap 7 press-fitted on an upper end portion of the cylindrical member 6, and a reel driving member 8 fitted for axial movement along an outer periphery of the cap 7. The reel driving member 8 has a plurality of (in normal cases, 3) engaging projections 8a for engagement with a tape reel (not shown) in a rotational direction and is normally urged upwardly (toward the end of the reel shaft 2) from below by means of a first spring member 9.

A gear 10 is mounted for rotation around an outer periphery of the cylindrical member 6 above the flange 5. The first spring member 9 is interposed between an upper surface of the gear 10 and the reel driving member 8. The gear 10 is driven to rotate by a turning force transmitted thereto from a motor (not shown) by way of a rotation transmission mechanism 20.

Meanwhile, a friction coupling member 11 is mounted for rotation on and relative to the reel shaft 2 between the flange 5 and the base 1. The friction coupling member 11 has a disk portion 12 and an arm portion 13 extending from an outer periphery of the disk portion 12 thereof. The arm portion 13 of the friction coupling member 11 engages with a mechanism 14 such as, for example, an automatic reversing mechanism or an automatic stopping mecahanism, which operates in response to rotation or stopping of the reel receiving body 3.

Friction members 15, 16 each in the form of a sheet such as, for example, a felt sheet, are interposed between the flange 5 and the gear 10 and between the flange 5 and the disk portion 12 of the friction coupling member 11. A second spring member 17 is interposed between the gear 10 and the cap 7 and urges the gear 10 to press against the flange 5 of the cylindrical member 6 via the friction member 15 in order to allow rotation of the gear 10 to be frictionally transmitted to the flange 5. The friction member 5, the second spring member 17 and the associated surfaces of the flange 5 and the gear 10 constitute a friction transmission mechanism 19 for transmitting a turning force applied to the gear 10 to the reel receiving body 3.

A third spring member 18 is interposed between the disk portion 12 of the friction coupling member 11 and the base 1 and normally urges the disk portion 12 toward the flange 5 via the friction member 16 in order to allow a turning force of the flange 5 to be frictionally transmitted to the disk portion 12 via the friction member 16. By this construction, a pressing force is applied to the friction coupling member 11 in response to rotation or stopping of the reel receiving body 3. However, since the friction coupling member 11 is held from rotation by the mechanism 14 with which the arm portion 13 thereof engages, the disk portion 12 thereof will produce a pressing force against the mechanism 14 in a direction of rotation thereof while yielding a slip between the disk portion 12 and the friction member 16.

If a tape reel (not shown) is loaded on the reel receiving device having such a construction as described above, that is, on the reel driving member 8 thereof and a turning force of the motor is transmitted to the gear 10 by way of the rotation transmission mechanism 20, the gear 10 is rotated thereby, and such rotation of the gear 10 is transmitted to the reel receiving body 3 by way of the friction transmission mechanism 19 to drive the tape reel to rotate.

Then, if a tape wound on the tape reel comes to its end, rotation of the reel receiving body 3 is stopped, yielding a slip between the gear 10 and the friction member 15. Consequently, the pressing force of the friction coupling member 11 against the mechanism 14 disappears so that, where the mechanism 14 is an automatic reversing mechanism, the feeding direction of the tape will be switched reversely. Meanwhile, where the mechanism 14 is otherwise an automatic stopping mechanism, the tape recorder will be stopped.

By the way, the first spring member 9 on one hand assists the second spring member 17 in providing a press contacting force between the gear 10 and the friction member 15 and on the other hand by itself urges the reel driving member 8 upwardly. Accordingly, if a reel hub is contacted with the top end of an engaging projection 8a of the real driving member 8 when a tape reel is loaded, the reel driving member 8 will be moved down once and then moved up back to its initial position to fit with the reel hub when the reel hub is disengaged from the engaging projection 8a after starting of rotation of the reel receiving body 3. Accordingly, the first spring member 9 is required to have a very low axial elastic force.

To the contrary, the second spring member 7 is required to have a significantly high axial elastic force because it must provide a sufficient press contacting force between the gear 10 and the friction member 15.

Meanwhile, the axial elastic force of the third spring member 18 need not be very high because it must only transmit information of whether the reel receiving body 3 is rotating or not as presence or absence of a pressing force of the friction transmission member 11 against the mechanism 14.

In summary, preferably the elastic forces of the first and third spring members 9 and 18 are low while the elastic force of the second spring member 17 is high.

However, as apparent from the structure described above, the first and second spring members 9 and 17 and the third spring member 18 press the gear 10, the flange 5 and the friction coupling member 11 toward each other from above and below. Accordingly, unless the third spring member 18 has an elastic force sufficient to defeat a composite pressing force of the first and second spring members 9 and 17, the reel receiving body 3 will move down or sink, causing a disadvantage that the reel driving member 8 and the gear 10, and in addition, the friction coupling member 11 will not be held to respective fixed vertical positions. Therefore, the elastic force of the second spring member 17 cannot be very high, and consequently, it is a problem that it is difficult to provide a sufficient press contacting force between the gear 10 and the friction member 15.

It is another disadvantage that a contact resistance appearing between the third spring member 18 and the base 1 checks an action of the friction coupling member 11 to follow the reel receiving body 3. This disadvantage may possibly cause a trouble, for example, that a sufficient pressing force is not applied to the mechanism 14 by the friction coupling member 11 while the reel receiving body 3 is rotating. This will cause operation in error of the mechanism 14 so that, for example, the feeding direction of a tape may be inadvertently switched reversely or the tape recorder may be stopped.

SUMMARY OF THE INVENTION

It is an object of the present invention to provide a reel receiving device of a high operational reliability which can assuredly transmit a turning force of a motor to a reel receiving body via a friction transmission mechanism and can effectively prevent operation in error of a mechanism such as an automatic reversing mechanism or an automatic stopping mechanism which operates in response to rotation or stopping of the reel receiving body.

In order to attain the object, according to the present invention, there is provided a reel receiving device, comprising a reel shaft erected on a base, a reel receiving body mounted for rotation on said reel shaft and having an engaging portion adapted to engage with a tape reel, said reel receiving body further having a pair of axially opposing surfaces, a friction transmission mechanism mounted for rotation on an outer periphery of said reel receiving body for frictionally transmitting a turning force of a motor to said reel receiving body, a friction coupling member located between said pair of opposing surfaces of said reel receiving body, and a spring member interposed between said friction coupling member and one of said opposing surfaces of said reel receiving body for pressing said friction coupling member toward the other of said opposing surfaces, said friction coupling member engaging with a mechanism which operates in response to rotation or stopping of said reel receiving body.

The above and other objects, features and advantages of the present invention will become apparent from the following description and the appended claims, taken in conjunction with the accompanying drawing.

DESCRIPTION OF THE PREFERRED EMBODIMENTS

Now, a preferred embodiment of the present invention will be described with reference to the accompanying drawings.

Figure 1:
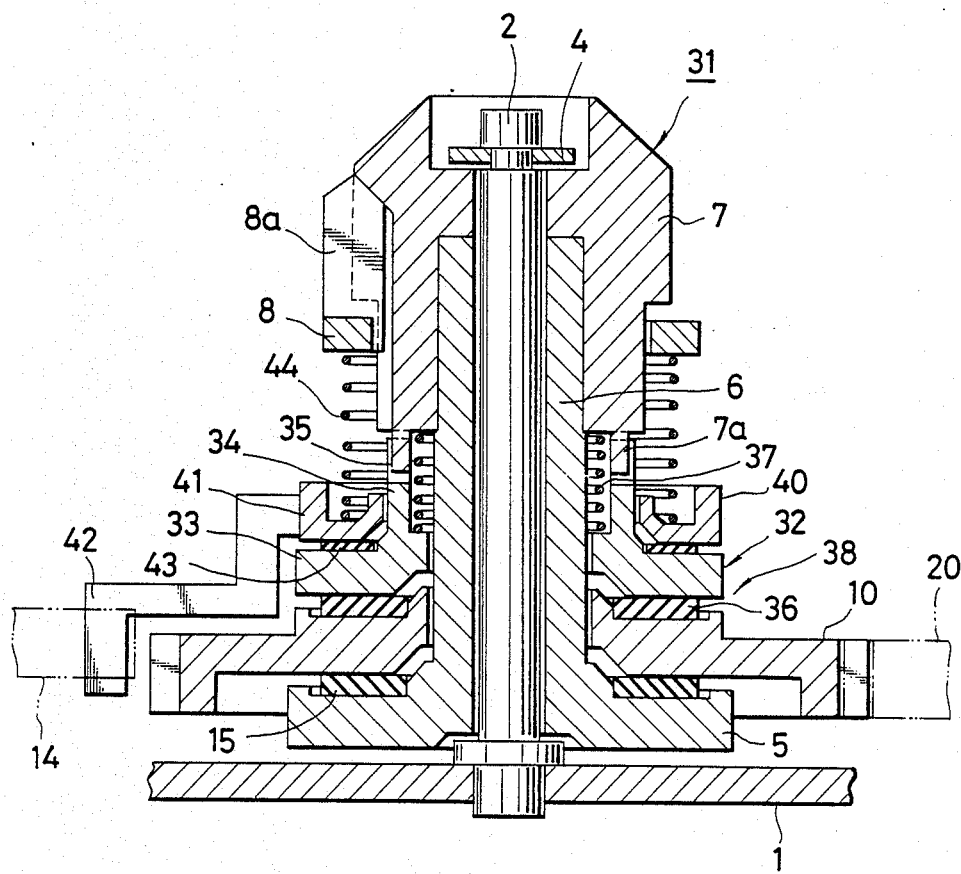
FIG. 1 is a vertical sectional view illustrating general construction of a reel receiving device according to an embodiment of the present invention.

Referring to FIG. 1, there is shown a general construction of a reel receiving device according to a preferred embodiment of the invention. In FIG. 1, like parts or components are denoted by like reference numerals to those of the conventional reel receiving device described hereinabove in conjunction with FIG. 2.

The reel receiving device shown includes a base 1 and a reel shaft 2 erected on the base 1. A reel receiving body 31 is mounted for rotation on the reel shaft 2 and is prevented from being pulled off axially upwardly by a stopper (for example, an E-snap ring) 4 fitted at an upper end portion of the reel shaft 2.

Figure 2:
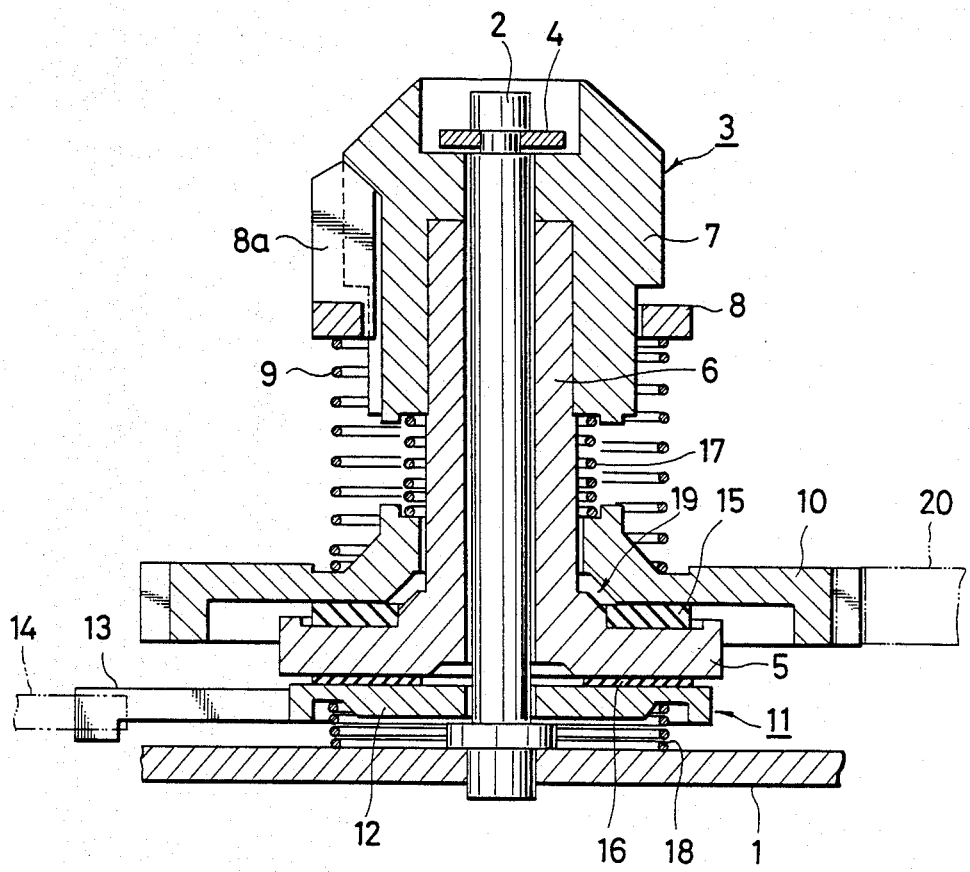
FIG. 2 is a similar view but illustrating general construction of a typical one of conventional reel receiving devices.

The reel receiving body 31 includes, similarly to the conventional reel receiving device shown in FIG. 2, a cylindrical member 6 having a flange 5 at a lower end thereof, a cap 7 press-fitted at an upper end of the cylindrical body 6, and a reel driving member 8 mounted for axial movement on an outer periphery of the cap 7. The reel receiving body 31 further includes a pressure receiving member 32 located between the cap 7 and a gear 10 which is mounted for rotation around an outer periphery of the cylindrical member 6 above the flange 5. In particular, the pressure receiving member 32 is located above the gear 10 and between a pair of axially opposing surfaces of the cap 7 and the flange 5 of the reel receiving body 31.

The pressure receiving member 32 includes a flange portion 33 and a cylindrical portion 34 located on the flange portion 33 and is mounted on an outer periphery of the cylindrical member 6 with an engaging portion 35 at an upper end of the cylindrical portion 34 thereof engaged with a complementary engaging portion 7a provided on the cap 7. Here, the engagement between the engaging portions 35 and 7a of the cylindrical portion 34 and the cap 7, respectively, is such that the pressure receiving member 32 may move in the axial direction relative to the cap 7 and may rotate in an integral relationship with the cap 7.

Friction members 36, 15 each in the form of a sheet such as a felt sheet are interposed between the flange portion 33 of the pressure receiving member 32 and the gear 10 and between the gear 10 and the flange 5 so that rotation of the gear 10 may be transmitted to the pressure receiving member 32 and the flange 5, respectively.

A second spring member 37 is located between the pressure receiving member 32 and the cap 7 inside of the cylindrical portion 34 of the pressure receiving member 32 so that its elastic force may urge the pressure receiving member 32 downwardly toward the gear 10 to provide press contacting forces between the flange portion 33 of the pressure receiving member 32 and the gear 10 and between the gear 10 and the flange 5 with the friction members 36 and 15 interposed therebetween, respectively. The second spring member 37, the friction members 36, 15 and the flange portion 33 of the pressure receiving member 32 constitute a friction transmission mechanism 38 for frictionally transmitting a turning force of the gear 10 to the reel receiving body 31.

Meanwhile, a friction coupling member 40 is mounted for rotation on an outer periphery of the cylindrical portion 34 above the flange portion 33 of the pressure receiving member 32. The friction coupling member 40 has, similarly to the friction coupling member 11 shown in FIG. 2, a disk portion 41 and an arm portion 42 extending radially outwardly from the disk portion 41. The arm portion 42 of the friction coupling member 40 engages with a mechanism 14 such as, for example, an automatic reversing mechanism or an automatic stopping mechanism, which operates in response to rotation or stopping of the reel receiving body 31.

A further friction member 43 in the form of a sheet such as a felt sheet is interposed between the disk portion 41 of the friction coupling member 40 and the flange portion 33 of the pressure receiving member 32, and a first spring member 44 is interposed between an upper surface of the disk portion 41 and the cap 7. Thus, an elastic force of the first spring member 44 urges the friction coupling member 40 to press against the flange portion 33 of the pressure receiving member 32 via the friction member 43. Accordingly, a turning force of the gear 10 is transmitted to the friction coupling member 40 to produce a pressing force of the friction coupling member 40 against the mechanism 14, while yielding a slip between the friction member 43 and the disk portion 41 of the friction coupling member 40.

According to the reel receiving device having such a construction as described above, if a tape reel (not shown) is loaded on the reel driving member 8 and a turning force of the motor is transmitted to the gear 10 by way of a rotation transmission mechanism 20, the gear 10 will be rotated thereby, and such rotation of the gear 10 is transmitted to the reel receiving body 31 to drive the tape reel to rotate.

Then, if a tape wound on the tape reel comes to its end, rotation of the reel receiving body 31 is stopped, yielding a slip between the gear 10 and the friction member 15 and between the gear 10 and the friction member 36. Consequently, the pressing force of the friction coupling member 40 against the mechanism 14 disappears so that the mechanism 14 will operate to reversely switch the feeding direction of the tape or to stop the tape recorder.

Here, in the friction transmission mechanism 38, a press contacting force between the flange portion 33 of the pressure receiving member 32 and the gear 10 with the friction member 36 interposed therebetween and a press contacting force between the gear 10 and the flange 5 with the friction member 15 interposed therebetween are derived mainly from the first spring member 37. Meanwhile, an elastic force of the second spring member 44 on one hand acts to press the reel driving member 8 upwardly and on the other hand acts in a direction to assist the press contacting force exerted in the friction transmission mechanism 38 by the first spring member 37.

Accordingly, the elastic force of the second spring member 37 can be increased to a degree sufficient to assure operation of the friction transmission mechanism 38. Meanwhile, the elastic force of the first spring member 44 can be reduced to facilitate axial movement of the reel driving member 8 because it must only provide between the friction coupling member 40 and the pressure receiving member 32 a frictional force sufficient to assure transmission of a pressing force of the friction coupling member 40 to the mechanism 14 in response to rotation or stopping of the reel receiving body 31.

Accordingly, it is made possible to design the elastic forces of the first and second spring members 44 and 37 independently to respective optimum values. Since the elastic force of the first spring member 44 can thus be designed to an optimum value, it is also possible to produce a sufficient pressing force against the friction coupling member 40 in response to rotation or stopping of the reel receiving body 31, and hence it is possible to effectively prevent the mechanism 14 from operating in error.

It is to be noted that the present invention is not limited to the specific embodiment shown in the drawing and described herein. For example, the reel driving member 8 and the cap 7 may be formed as an integral single body. In this instance, the first spring 44 will provide two actions to press the friction coupling member 40 against the pressure receiving member 32 via the friction member 43 and to assist the press contacting force exerted in the friction transmission mechanism 38 by the second spring member 37.

It is also possible to integrate the cap 7 and the pressure receiving member 32 into a single body while omitting the friction member 36 between the cap 7 and the pressure receiving member 32 and to extend the second spring member 37 between the cap 7 and the gear 10. This structure will provide similar effects as in the embodiment described hereinabove.

As apparent from the foregoing description, according to the present invention, the axial elastic force of the first spring member 44 can be reduced independently of the second spring member 37, and hence the press contacting force between the friction coupling member 40 and the friction member 43 can be reduced. Further, since the first spring member 44 and the friction coupling member 40 are located between a pair of axially opposing surfaces of the reel receiving body 31 which rotate and stop in a simultaneous relationship, the friction coupling member 40 follows rotation and stopping of the reel receiving body 32 assuredly. Accordingly, the friction coupling member 40 can assuredly produce a pressing force against the mechanism 14 in response to rotation or stopping of the reel receiving body 32, and hence a stabilized operation of the mechanism 14 can be assured.

Meanwhile, the second spring member 37 can have an elastic force strong enough to provide a predetermined press contacting force in the friction transmission mechanism 38 because it must only exert the pres contacting force without having an influence on the first spring member 44. In other words, since the pressing forces exerted in the friction transmission mechanism by the first and second spring members 44 and 37 act in the same direction, a strong elastic force of the second spring member 37 will not damage a function of the first spring member.

Thus, the reel receiving device according to the present invention is simplified in construction (reduced in quantity of spring members) and its operation is made more certain comparing with the conventional reel receiving device shown in FIG. 2. In this manner, it is apparent that the reel receiving device according to the present invention exhibits various effects in practical use over the conventional reel receiving device.

Having now fully described the invention, it will be apparent to one of ordinary skill in the art that many changes and modifications can be made thereto without departing from the spirit and scope of the invention as set forth herein.

What is claimed is:

1. A reel receiving device, comprising a reel shaft erected on a base, a reel receiving body mounted for rotation on said reel shaft and having an engaging portion adapted to engage with a tape reel, said reel receiving body further having a pair of axially opposing surfaces, a friction transmission mechanism mounted for rotation on an outer periphery of said reel receiving body for frictionally transmitting a turning force of a motor to said reel receiving body, a friction coupling member located between said pair of opposing surfaces of said reel receiving body, and a spring member interposed between said friction coupling member and one of said opposing surfaces of said reel receiving body for pressing said friction coupling member toward the other of said opposing surfaces, said friction coupling member engaging with a mechanism which operates in response to rotation or stopping of said reel receiving body.

2. A reel receiving device according to claim 1, wherein said reel receiving body includes a cylindrical member having a flange at which said cylindrical member receives a turning force from said friction transmission mechanism, a cap press-fitted at an upper end of said cylindrical member, a reel driving member mounted for axial movement on an outer periphery of said cap, and a pressure receiving member connected to a lower end of said cap, said spring member being interposed between said friction coupling member and that one of said opposing surfaces of said reel receiving body which is nearer to said reel driving member and adjacent which said reel driving member and said pressure receiving member is opposed in an axial direction.

3. A reel receiving device according to claim 2, wherein said pressure receiving member is connected for axial movement relative to and for integral rotation with said cap, and said friction transmission mechanism includes said pressure receiving member, said flange of said cylindrical member, a rotatable member in the form of a plate interposed between said cap and said pressure receiving member, and a second spring member interposed between said cap and said pressure receiving member for pressing said pressure receiving member toward said rotatable member.

* * * * *